United States Patent
Kang et al.

(12) 
(10) Patent No.: US 6,370,133 B1
(45) Date of Patent: Apr. 9, 2002

(54) CDMA RECEIVER AND METHOD OF OPERATION

(75) Inventors: Inchul Kang, Los Gatos; Winston Y. Sun, Palo Alto, both of CA (US)

(73) Assignee: Hyundai Electronics America, Inc., San Jose, CA (US)

( * ) Notice: Subject to any disclaimer, the term of this patent is extended or adjusted under 35 U.S.C. 154(b) by 0 days.

(21) Appl. No.: 09/113,791

(22) Filed: Jul. 10, 1998

(51) Int. Cl.[7] ................................................ H04J 13/00
(52) U.S. Cl. ....................................................... 370/342
(58) Field of Search ................................ 370/441, 442, 370/342, 347, 465, 466, 335, 320, 350, 286, 290, 331, 324, 318, 317; 375/130, 137, 254, 227, 147, 148, 150, 144, 261, 264, 319, 318, 362, 364, 354, 226, 215, 221; 455/38.3, 13.4, 500, 132, 135

(56) References Cited

U.S. PATENT DOCUMENTS

| | | | |
|---|---|---|---|
| 5,268,927 A | * 12/1993 | Dimos et al. ................... 375/1 |
| 5,361,276 A | 11/1994 | Subramanian ................... 375/1 |
| 5,422,909 A | 6/1995 | Love et al. ................... 375/200 |
| 5,570,349 A | 10/1996 | Bustamante et al. | |
| 5,640,416 A | * 6/1997 | Chalmers ..................... 375/371 |
| 5,715,516 A | 2/1998 | Howard et al. | |
| 5,812,542 A | * 9/1998 | Bruckert et al. ............ 370/335 |
| 6,097,713 A | * 8/2000 | Ichihara ....................... 370/335 |
| 6,097,955 A | * 8/2000 | Bhat ........................... 455/445 |

* cited by examiner

*Primary Examiner*—Dang Ton
(74) *Attorney, Agent, or Firm*—Townsend and Townsend and Crew LLP

(57) ABSTRACT

The present invention provides a CDMA receiver which uses less expensive, more manufacturable digital filters in combination with noise cancellation circuitry to attenuate highly correlated signals. In addition, the CDMA receiver employs digital IF sampling in the baseband conversion process to remove superimposed DC voltages from the baseband data, obviating the need for DC offset voltage generators.

13 Claims, 4 Drawing Sheets

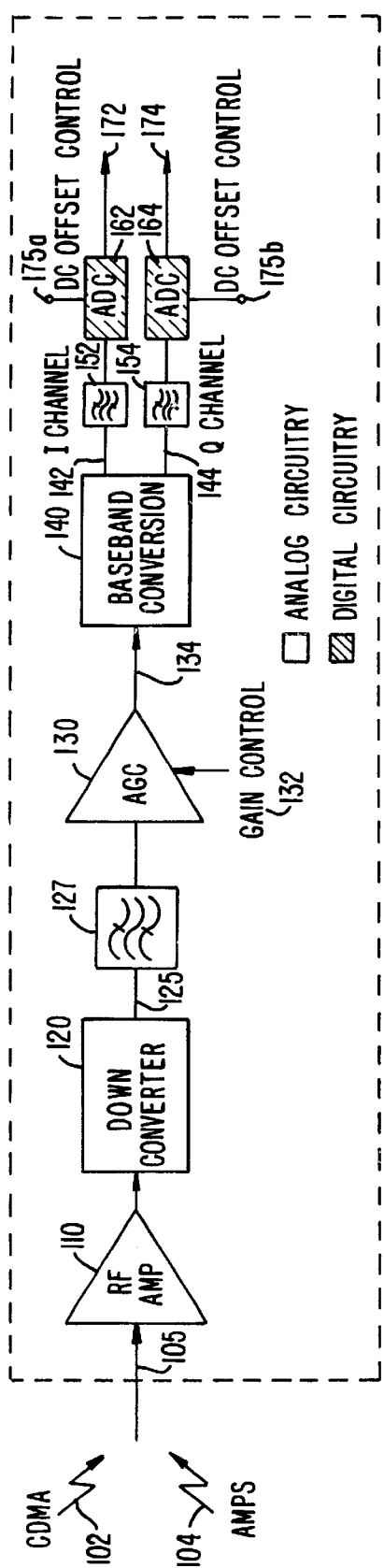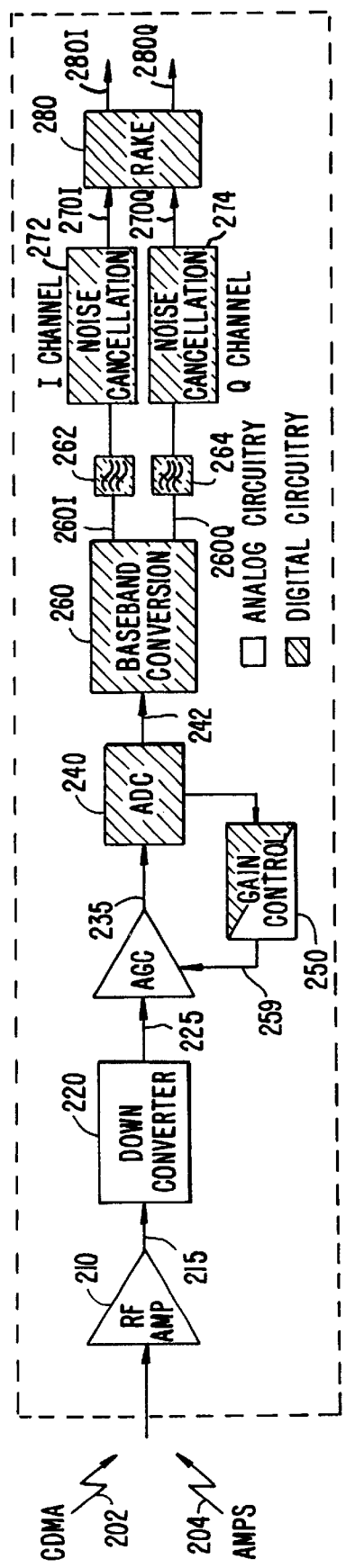

CDMA RECEIVER AND METHOD OF OPERATION

CROSS REFERENCE TO RELATED APPLICATIONS

The following commonly-owned applications are being filed concurrently and are incorporated herein by reference in its entirety for all purposes:

U.S. patent application Ser. No. 09/113,603, filed Jul. 10, 1998, entitled "AN IMPROVED CDMA TRANSCEIVER AND FREQUENCY PLAN," now U.S. Pat. No. 6,028,850.

U.S. Provisional Pat. App. No. 60/092,374, Jul. 10, 1998, entitled "A VARIABLE CLOCK RATE CORRELATION CIRCUIT FOR A CDMA RECEIVER AND METHOD OF OPERATION."

BACKGROUND OF THE INVENTION

This invention relates to receivers, and in one embodiment, to a dual mode CDMA/AMPS wireless receiver capable of accurately processing CDMA signals in the presence of AMPS interferers.

In the field of telecommunications, Direct Sequence (DS) Code Division Multiple Access (CDMA) transmission is a popular form of communication because a large number of users may communicate over the same frequency band without interference. In DS-CDMA systems, data is transmitted to an intended recipient by initially generating an address corresponding to the data which is to be transmitted. The address is then combined with a unique pseudo-random bit sequence (PN sequence) to form a combined waveform. The pseudo random sequence causes the combined waveform to appear highly uncorrelated, i.e., unpredictable. The combined waveform is then modulated onto a particular carrier frequency, ranging from 1931.25 MHz–1988.75 MHz in the PCS-band systems or in the frequency range of 869.04 MHz–893.97 MHz in the cellular-band systems. Although many users have access to the signals within a particular frequency band (typically 1.23 MHz wide), none can decipher the combined waveform since it appears to be random. Only the intended recipient is able to decode the combined waveform since his receiver alone produces the same PN sequence used to encode the data within the transmitter.

The transmitted data typically consists of two orthogonally-phased data streams (I and Q data) which are interleaved onto a single data stream prior to transmission. The orthogonal orientation between the I and Q data allows the compilation and transmission of the two data streams without interference between them. The modulated data stream is subsequently transmitted as "chips" to the receiver. The receiver removes the modulation and separates the original I and Q data from the single data stream.

FIG. 1 illustrates a typical receiver for the reception of the orthogonal DS-CDMA signals. The CDMA receiver 100 includes an RF amplifier 110, a downconverter 120, an automatic gain control amplifier (AGC) 130, a baseband conversion circuit 140, baseband analog filters 152 and 154, and I and Q channel analog to digital converters (ADCs) 162 and 164. Analog circuitry is shown in white, and digital circuitry is shown in gray.

During reception, A CDMA signal 102 is received by an electromagnetic collecting apparatus such as an antenna (not shown) and supplied to the CDMA receiver 100. The RF amplifier 110, typically a low noise amplifier (LNA), is used to increase the amplitude of the CDMA signal 102. A downconverter 120 is used to convert the input signal 105 to an IF signal 125 of lower frequency which the subsequent circuitry can process. The downconverter may consist of a single or multiple downconversion stages to frequency translate the RF signal to its final IF frequency.

The IF signal 125 is supplied to the AGC circuit 130 which provides variable signal gain to account for the varying distances over which the received signal may propagate. The AGC circuit 130 can be controlled via a gain control signal 132 to provide attenuation or gain in varying degrees, producing an AGC output signal 134. The AGC circuit 130 typically provides a sufficient amount of gain or attenuation so that the amplitude level of the I and Q signals supplied to the analog to digital converters (ADCs) 162 and 164 is within an optimum input power range.

A baseband conversion circuit 140, typically an analog quadrature downconverter circuit, is used to extract the I and Q data from the AGC output signal 134, producing I and Q channel baseband signals 142 and 144. This process typically involves frequency translating the AGC output signal 134 to lower frequency I and Q baseband signals 142 and 144 as well.

The I and Q channel analog filters 152 and 154 are used to filter out any out-of-band signals prior to the ADCs 162 and 164. Additional filtering 127 may be required within the receiver 100 to achieve the necessary out-of-band rejection.

The I and Q analog filters 152 and 154 are also designed to have precise group delay response. Prior to transmission, the phase of the CDMA signal is pre-distorted for optimum signal transmission. In order for the I and Q data to be properly reconstructed at the receiver output, the phase response over the communication channel (i.e., between the transmitter input and the receiver output) should be near linear. Thus, the analog filters 152 and 154 must be designed to provide a specific phase response which, when combined with the filters used within the CDMA transmitter (not shown) is a particular value.

Additionally, the I and Q channel analog filters 152 and 154 must be closely matched to provide substantially identical amplitude and phase responses. The close amplitude and phase matching ensures that the I and Q channel data are equally affected by the filtering stage. The analog filters 152 and 154 are typically realized in switched capacitor form and may be fabricated in IC form or from discrete components.

I and Q channel ADCs 162 and 164 receive the filtered I and Q baseband signals, converting the signals to I and Q channel data 172 and 174, respectively. Two DC offset voltages 175a and 175b are supplied to the ADCs 172 and 174 to correct for the DC voltage level superimposed on the filtered baseband signals 142 and 144 as a side-effect of the downconversion and analog to digital (A-D) conversion process. The I and Q channel data 172 and 174 is then fed into I and Q channel correlators (not shown) to determine the degree of correlation with the receiver's address code.

One disadvantage of the conventional CDMA receiver is its inability to reject correlated interfering signals. One such type of signal is generated from the Advanced Mobile Telephone System (AMPS), also commonly used in cellular telephony today. The AMPS system is an analog Frequency Division Multiple Access (FDMA) system in which data is communicated using frequency modulation (FM). Each user is allocated a particular carrier bandwidth, typically 30 KHz, which carries that user's transmissions. The AMPS signals are narrow band (30 KHz) compared to the CDMA signals (1.23 MHz) and are highly correlated.

Unfortunately, the AMPS system transmits its FM signals within the CDMA receiver band, 869.04 MHz–893.97 MHz. When the AMPS and CDMA signals 102 and 104 are both received by a non-linear device, such as the RF amplifier 105 within the CDMA receiver, a two-tone third order intermodulation product or "AMPS interferer" can be produced at the amplifier's output which is within the CDMA receivers band. Once within the CDMA receiver's band, the AMPS interferer can propagate as a false CDMA signal, causing erroneous data output and signal distortion. The inability of the conventional CDMA receiver to operate in environments where AMPS or other highly correlated signals propagate severely limits the use and operability of the conventional CDMA receiver.

Another disadvantage of the conventional CDMA receiver is the high cost and marginal performance associated with the I and Q channel analog filters 152 and 154. The I and Q channel analog filters 152 and 154 are needed to provide rejection of the out-of-band signals and add phase correction to the incoming signal. Additionally, the I and Q channel analog filters 152 and 154 must be closely matched to each other. If fabricated from discrete components, each of the analog filters 152 and 154 would require an extensive amount of time and labor to tune and test, and represents a significant cost factor of the CDMA receiver.

Alternatively, the analog filters 152 and 154 may be fabricated in integrated circuit (IC) form using Bipolar-CMOS (Bi-CMOS) technology. Bi-CMOS IC processing allows for the fabrication of analog and digital circuitry on the same IC die. Using this IC process, the analog filters can be fabricated in IC form without tuning. However, the Bi-CMOS technology is more expensive to implement and suffers from lower yields compared to the more mature digital CMOS or analog Bipolar IC processing technologies.

A further disadvantage of the conventional CDMA receiver architecture is the implementation of separate I and Q channel ADCs 152 and 154. The I and Q channel ADCs 152 and 154 can have slightly different amplitude and/or phase response characteristics. Implementing separate ADCs increases the likelihood that the I and Q channel data 172 and 174 will exhibit some amplitude and/or phase imbalance.

Still a further disadvantage of the conventional CDMA receiver is the need for DC offset voltage sources 175a and 175b to correct for the DC voltage superimposed onto the IF and baseband signals occurring as a side effect of the downconversion and the A-D conversion process. If left uncorrected, the added DC voltage will result in erroneous data I and Q channel data values and a degraded receiver bit error rate (BER).

What is needed is a new CDMA receiver architecture which remedies the aforementioned shortcomings of the conventional CDMA receiver. Specifically, a new CDMA receiver is needed which can discriminate and remove AMPS interfering signals and other correlated signals from the received signals. Also needed is a CDMA receiver architecture which employs low cost, highly manufacturable filters for providing the required out-of-band signal rejection and phase response. Further needed is a CDMA receiver architecture which consists of a single ADC for converting the IF signal to a digital data stream. Use of a single ADC will reduce the likelihood of introducing amplitude and/or phase imbalance between the I and Q channel data. Lastly, a new CDMA receiver architecture is needed which does not require the use of a DC offset source to correct for an superimposed DC voltage.

SUMMARY OF THE INVENTION

The present invention provides for a new CDMA receiver which uses digital noise cancellation circuitry to remove the AMPS interferer or any other highly correlated signal from the receiver during CDMA reception. The new CDMA receiver also employs less expensive, more manufacturable digital IC filters to provide the needed adjacent channel rejection and phase response necessary for proper I and Q data reconstruction. In addition, the new CDMA receiver uses a single ADC to convert the IF signal to a digital data stream containing orthogonally-phase I and Q data. Further, the new CDMA receiver employs IF sampling in the baseband conversion process to remove any superimposed DC voltage from the baseband data.

In one embodiment the CDMA receiver includes a RF amplifier, a downconverter, an analog to digital converter (ADC), a baseband conversion circuit, an I channel digital filter, a Q channel digital filter, an I channel digital noise cancellation circuit, and a Q channel digital noise cancellation circuit. The RF amplifier receives and amplifies and the downconverter downconverts the CDMA signal to an IF signal having an AMPS interfering component. The ADC receives and converts the CDMA+AMPS interfering signal to digital data. The baseband conversion circuit use an IF sampling technique to remove any superimposed DC voltage from the digital data by alternatively negating output data words and subsequently adding data word pairs together, thereby removing any commonly occurring magnitude. The AMPS interfering component is reduced by the noise cancellation circuitry which detects and removes highly correlated signals, such as the AMPS signal.

A further understanding of the nature and advantage of the invention herein may be realized by reference to the remaining portions of the specification and attached drawings.

BRIEF DESCRIPTION OF THE DRAWINGS

FIG. 1 illustrates the block diagram of a conventional CDMA receiver known in the art.

FIG. 2 illustrates the block diagram of a new CDMA receiver architecture in accordance with the present invention.

DESCRIPTION OF THE PREFERRED EMBODIMENT

Figure 3:
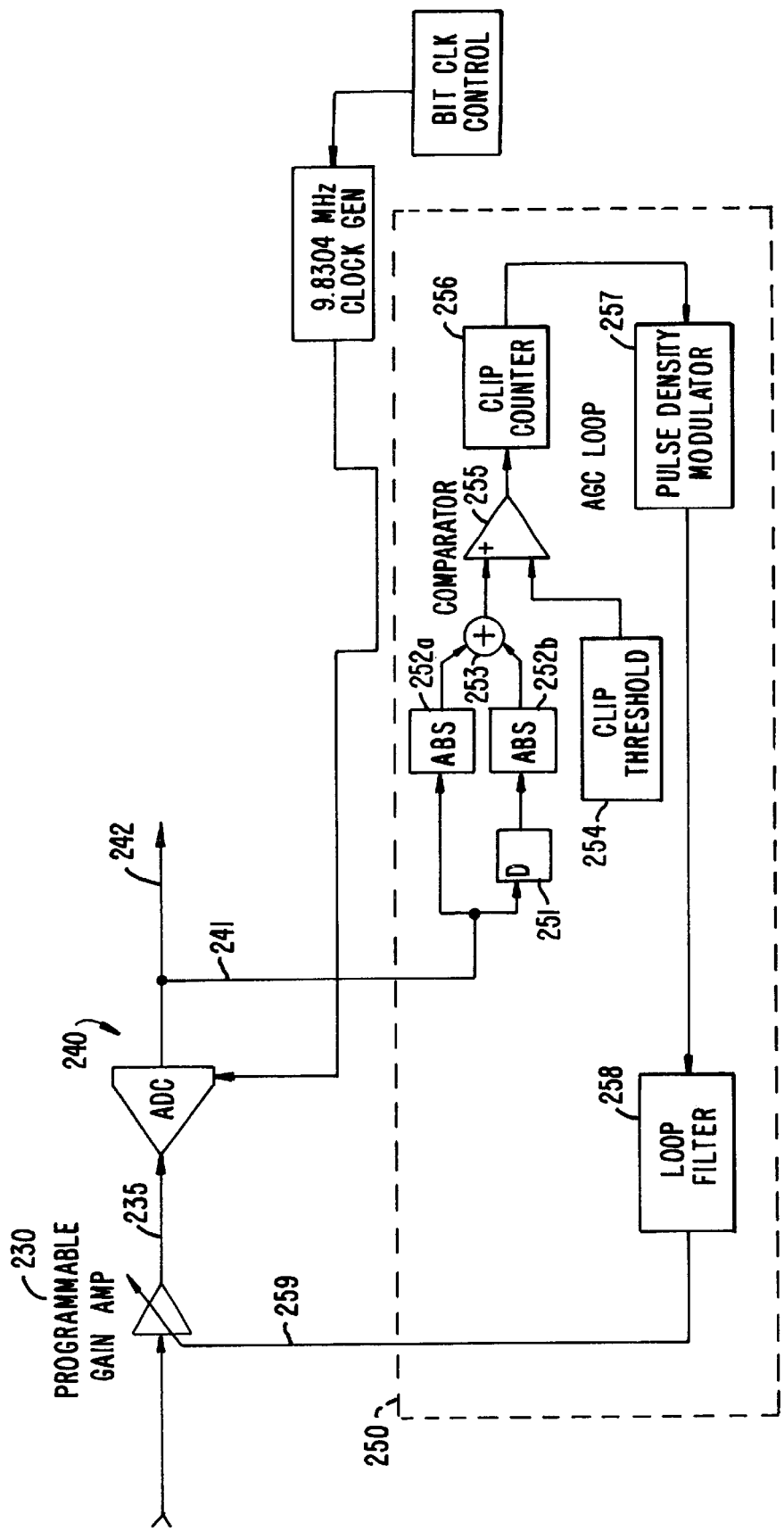
FIG. 3 illustrates an exemplary embodiment of the gain control circuit in accordance with the present invention.

FIG. 2 illustrates one embodiment of the CDMA receiver in accordance with the present invention. The new CDMA receiver 200 includes a RF amplifier 210, a downconverter 220, an AGC circuit 230, an ADC 240, a gain control circuit 250, a digital baseband conversion circuit 260, I and Q channel digital filters 262 and 264, I and Q channel digital noise cancellation circuits 272 and 274, and a rake receiver 280.

In operation, the receiver 200 receives a CDMA signal 202 and an AMPS signal 204. The RF amplifier 210 receives and amplifies the received AMPS and CDMA signals 202 and 204. In its preferred embodiment, the RF amplifier 210 is a FET-based LNA designed to operate either in the PCS-band (1931.25 MHz–1988.75 MHz) or the cell-band (869.04 MHz–893.9 MHz), as described in the co-pending patent application Ser. No. 09/113,603, "AN IMPROVED CDMA TRANSCEIVER AND FREQUENCY PLAN, now U.S. Pat. No. 6,028,850" herein incorporated by reference.

Because of the inherent non-linearity of the RF amplifier 210, the RF amplifier generates an in-band AMPS interferer in addition to the amplified CDMA signal at the RF amplifier output 215 (CDMA+AMPS interferer). The RF amplifier 210 is chosen to have a high degree of linearity so as to minimize the amplitude of the generated AMPS interferer.

The CDMA+AMPS interferer signal 215 is supplied to a downconverter 220. In response, the downconverter 220 produces an IF signal 225 which retains a portion of the AMPS interferer. In its preferred embodiment, the downconverter 220 is a two-stage super-heterodyne downconverter, as described in the aforementioned co-pending patent application Ser. No. 09/113,603, now U.S. Pat. No. 6,028,850, "AN IMPROVED CDMA TRANSCEIVER AND FREQUENCY PLAN."

An AGC circuit 230 receives the IF signal 225 containing both the CDMA and AMPS interferer components, and provides a signal gain to produce an AGC output signal 235. In the preferred embodiment, the gain of the AGC circuit 230 ranges from –45 db to +45 dB. The gain is controlled by a control signal 259 received from a gain control circuit 250, further described below.

The AGC output signal 235 is supplied to a single ADC 240. The ADC 240 converts the AGC output signal 235 to digital data, which in the preferred embodiment is a stream of 10-bit data words, each data word having a value ranging from +511 or –512. In the preferred embodiment, the ADC 240 outputs an even number of 10-bit data words every correlation period.

The ADC 240 is designed to have an input amplitude range which will result in an unclipped data word, i.e., the produced data word does not exceed beyond the range of +511 or –512 in magnitude. The input amplitude calculation takes into account the most statistically probable amplitude of the AMPS interferer signal. In the preferred embodiment, the ADC 240 is designed with an input amplitude range which will produce unclipped data 99.7% of the time (called "3σ" statistics). Accordingly, the gain of the AGC amplifier 230 is controlled so that the total signal amplitude (CDMA+ AMPS interferer) supplied to the ADC 240 is within this desired "3σ" amplitude range.

To control the amount of gain and signal amplitude output from the AGC circuit 230, the ADC 240 communicates the input level it senses to a gain control circuit 250. In response, the gain control circuit 250 generates a gain control signal 259 which it sends to the AGC circuit 230 to alter its gain up or down.

FIG. 3 illustrates one embodiment of the gain control circuit 250. The gain control circuit 250 includes a signal delay 251, absolute value operators 252a and 252b, an adder 253, a clip threshold generator 254, a comparator 255, a clip counter 256, a pulse density modulator 257, and a loop filter 258.

During operation, a 10-bit data word 241 is generated at the output of the ADC 240 and supplied to two branches of the gain control circuit 250. A first absolute value operator 252a determines the magnitude of the current data word. A second absolute value operator 252b measures the magnitude of a previous data word using a signal delay 251. A magnitude which is too large indicates the ADC circuit 240 is close to clipping and the input signal strength is too high. A magnitude which is too small indicates that the signal-to-quantization noise ratio is low and that more input signal strength is needed. The magnitudes of the current and previous data words are averaged by means of an adder 253 and supplied to the non-inverting terminal of the comparator 255.

A clip threshold value 254 is supplied to the inverting terminal of the comparator 255. The clip threshold value 254 is set to the magnitude above which a predefined number of data words will exceed during a predefined interval. In the preferred embodiment, the clip threshold value 254 corresponds to a data word magnitude (approximately 509) which will result in 30–50 clipped signals over a 10,000 word period. Thus, the gain control circuit 250 will attempt to stabilize the gain of the AGC circuit 230 so that the ADC circuit 240 will clip 30–50 data words out of 10,000 data words. In the exemplary embodiment of FIG. 3, the clip threshold value 254 is approximately twice the value of each 10-bit data word since two 10-bit data words are added and used in the comparison.

When the magnitude of the added data words exceeds the magnitude of the clip threshold value 254, the comparator 255 increments a clip counter 256. After a predetermined period, the clip counter 256 supplies its accumulated count to a pulse density modulator 257. In response, the pulse density modulator 257 generates a number of pulses within a predefined pulse period, the number of pulses corresponding to the number of counts received from the clip counter 256. If the number of clip counts is small, only a few pulses are generated, and the resulting pulse density is low. If the number of clips is large, a large number of pulses are generated and the resulting pulse density is high.

The pulse density is supplied to a lowpass filter (LPF) 259. The LPF 258 operates as a simple DAC to produce a average value DC voltage. The averaged value DC voltage functions as the gain control signal 259 and is supplied to the AGC circuit 230. The voltage is used to control the AGC circuit to increase or decrease the signal gain and accordingly the output signal strength of the AGC signal 235.

Other gain control circuits are possible. For instance in an alternative embodiment, the gain control circuit 250 may sample the AGC signal 235 prior to its injection into the ADC. The gain control circuitry 251–259 described above may be realized in analog or digital-based circuitry and fabricated in either IC or discrete form. In the preferred embodiment, the signal delay 251, the absolute value operators 252a and 252b, the adder 253, the clip threshold source 254, the comparator 255, the clip counter 256, and the pulse density modulator 257 are IC CMOS digital circuits and the loop filter 258 is an external RC low pass filter.

The ADC output 242 is supplied to the baseband conversion circuit 260 which, in response, produces I and Q channel data 260i and 260q. The baseband circuit 260 together with the rake receiver 280 removes any DC voltage which may have been added to signal during the downconversion and A-D conversion operations.

Figure 4:
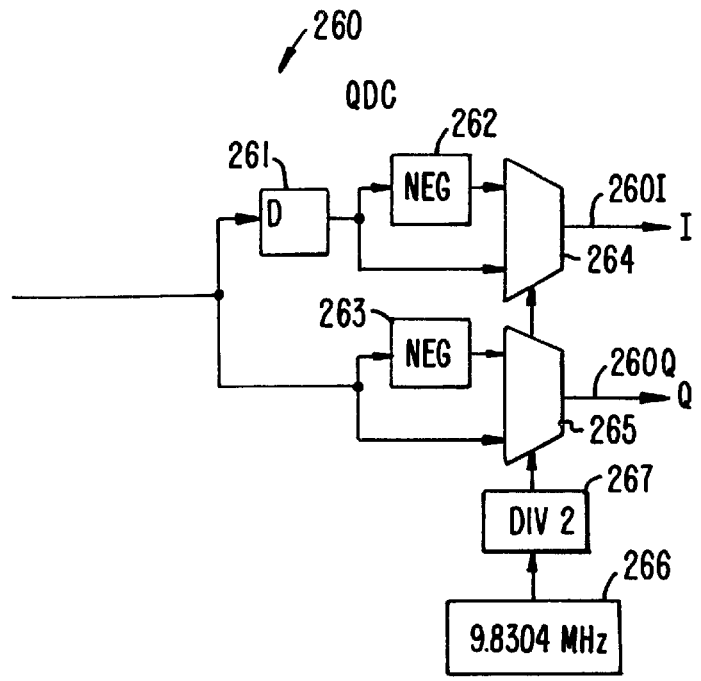
FIG. 4 illustrates an exemplary embodiment of the baseband circuit in accordance with the present invention.

FIG. 4 illustrates one embodiment of the baseband conversion circuit 260 as a quadrature downconverter (QDC) circuit. The QDC 260 operates as a digital downconverter to convert the ADC data 242 to I and Q channel baseband data 260i and 260q. Additionally, the QDC 260 performs a first IF sampling operation to remove the superimposed DC voltage level from the ADC data 242 by alternatively negating the I and Q channel data words. The rake receiver 280 performs a second operation on the alternatively negated data words to remove the DC voltage from the magnitude of the data words, as will be described below.

In operation, the QDC 260 spectrally shifts the ADC output 242 by exactly negative one-fourth of a provided sampling frequency, dividing the ADC output 242 into in-phase (I channel) and quadrature phase (Q channel) data 260*i* and 260*q*. In the preferred embodiment, the QDC 260 consists of a signal delay 261, negation circuits 262 and 263, and I and Q channel multiplexers 264 and 265. It is further preferred that a sampling source 266 operates at 8 times the ADC data rate (1.2288 MHz) or 9.8304 MHz. A one-half frequency divider 267 is used to convert the 9.8304 MHz sampling signal to 4 times the ADC data rate or 4.9152 MHz.

The QDC 260 receives the ADC output 242 and produces I channel data 260*i* described by eq (1):

*I* data=[ADC output]* cos (¼*2Π*$fs$*$t_w$+θ) and *Q* channel data 260*q* described by eq (2): (1)

*Q* data=[ADC output]* −sin (¼*2Π*$fs$*$t_w$+θ) (2):

Where
  fs=sampling frequency
  $t_w$=word period
  θ=word phase

One possible realization of the I channel cos multiplier is the sequence: 1, 0, −1, 0, . . . The Q channel −sin multiplier similarly produces the sequence 0, −1, 0, 1, . . . Thus, the QDC 260 operates to multiply the ADC output data 242 by zeros and ±1 for successive data words. By way of an example, if a, b, c, d are successive data words output from the ADC 242 during one sample period, the I channel output data 260*i* becomes: a, 0, −c, 0. The Q channel output data 260*q* becomes: 0, −b, 0, d. Further, since the ADC 240 is sampled at greater than twice the Nyquist rate needed for recovering all of the information, half of the output data (the zero value data) may be decimated without loss of information. The I channel data 260*i* becomes: a, −c, and the Q channel data 260*q* becomes: −b, d. Collectively, all of the information is retained (a, b, c, and d), but the data words in each I and Q channels are alternately negated. The alternating signs of the I and Q channel data words are used by the rake receiver 280 to remove any DC voltage level which may persist in the magnitude of the data words, as will be described below.

The I and Q channel data words 260*i* and 260*q* are subsequently supplied to I and Q channel digital filters 262 and 264, respectively. The digital filters 262 and 264 are designed to remove adjacently occurring out-of-band interference from the data words and are preferably fabricated using CMOS IC processing. CMOS IC processing allows for a more reliable, less expensive fabrication process compared to the analog baseband filters 152 and 154 of the conventional CDMA receiver. Additionally, each filter's rejection and phase response may be tightly controlled using IC design techniques as conventionally known. The filters 262 and 264 are preferably 6th order digital elliptic low pass filters exhibiting 60 dB of rejection at 933 KHz.

The filtered I and Q channel data words 260*i* and 260*q* are supplied to I and Q channel noise cancellation circuits 272 and 274, respectively. The noise cancellation circuits 272 and 274 are used to remove the AMPS interferer from the I and Q data words 260*i* and 260*q* prior to signal processing. Each of the noise cancellation circuits 262 and 264 operate to remove highly correlated signal components from the data words. The CDMA data component is pseudo-random and uncorrelated, and as such is not attenuated by the noise cancellation circuits. In contrast, the AMPS interferer data component is highly correlated in nature. The noise cancellation circuits identifies and removes the highly correlated AMPS interferer component, leaving only the CDMA component of the output data word.

Figure 5:
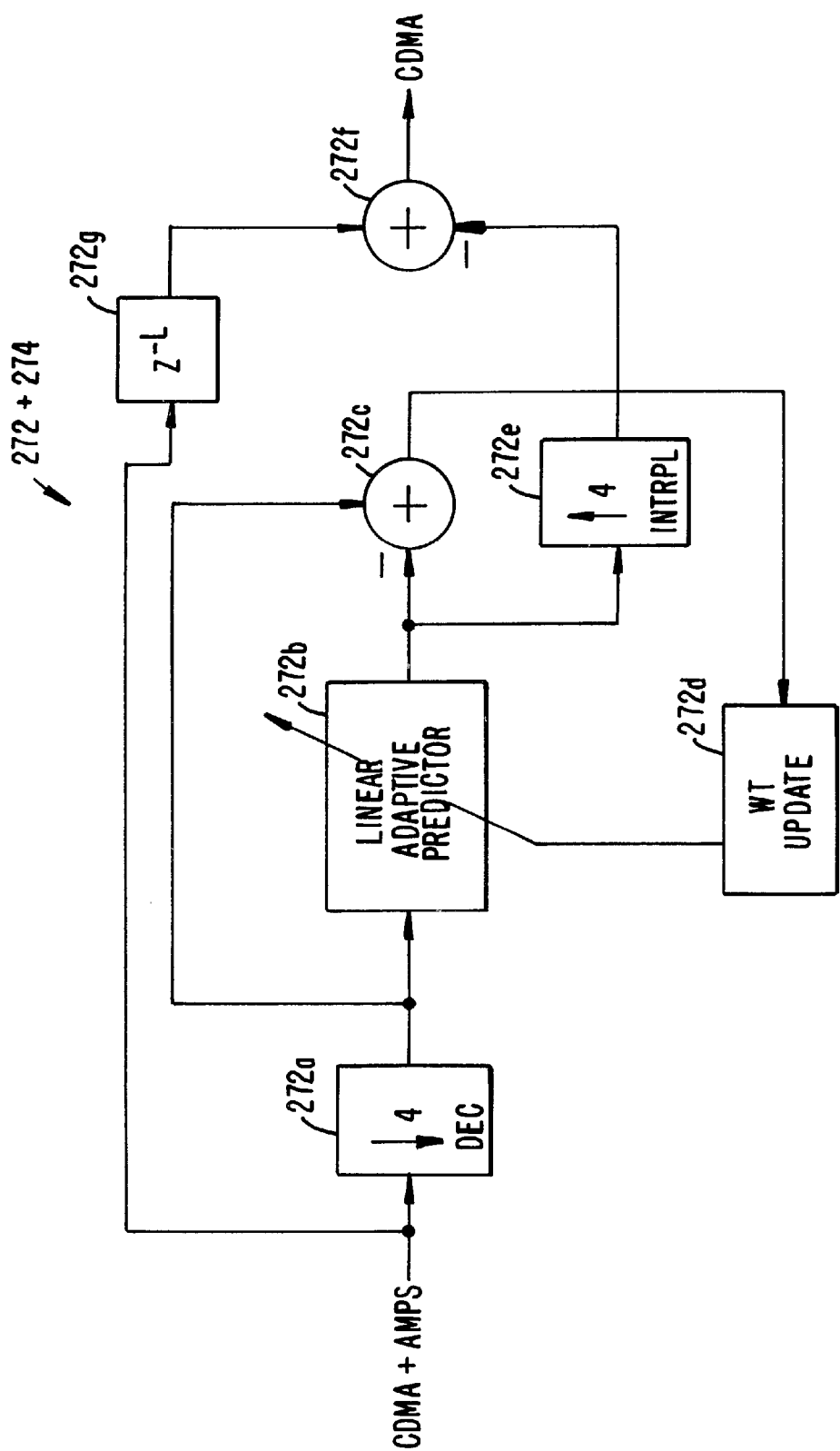
FIG. 5 illustrates an exemplary embodiment of the noise cancellation circuit in accordance with the present invention.

FIG. 5 illustrates one embodiment of the I and Q channel noise cancellation circuits 272 and 274. Each noise cancellation circuit includes a decimate-by-4 circuit 272*a*, a linear adaptive predictor 272*b*, adders 272*c* and 272*f*, a weight update circuit 272*d*, an interpolate-by-4 circuit 272*e*, and a delay circuit 272*g*.

In operation, the I and Q channel data words 260*i* and 260*q* having the AMPS interferer and CDMA components is received along the I and Q channel paths as shown in FIG. 2. A decimate-by-4 circuit 272*a* eliminates 3 of the 4 data words every period, outputting one data word per period. The reduction in the number of data words results in the CDMA component appearing unpredictable. However, one data word per period for the AMPS interferer does not render it unpredictable. In the preferred embodiment where the I and Q channel data words 260*i* and 260*q* are supplied from the baseband conversion circuit 250 at a rate of 4.9152 MHz, the decimate-by-4 circuit 272*a* reduces the effective sampling rate by a factor of 4 to 1.2288 MHz. This effective sampling rate is still quite large compared to the AMPS data rate (30 KHz), resulting in the AMPS interferer component being sampled over 40 times during one sampling period. Because the AMPS interferer component is highly oversampled, its signal behavior can be accurately predicted.

The decimated CDMA+AMPS data word is fed into the linear adaptive predictor 272*b*. The CDMA component is insufficiently sampled to allow prediction, thus the predictor 272*b* does not operate upon it. The AMPS interferer is highly predictable and the predictor 272*b* operates upon the AMPS component, predicting the next occurring AMPS component. The predicted AMPS component is negated and supplied to an adder 272*c*, subtracting it from the next occurring decimated AMPS+CDMA word. The difference is fed to a weight update circuit 272*d*. Assuming the CDMA component is not predictable, the difference generated by the adder 272*c* will be due solely to the error of the predictor 272*b* in predicting the AMPS component. The weight update circuit 272*d* reads the difference between the predicted AMPS component and actual AMPS component and tunes the predictor 272*b* to minimize the error between the two during the next sample period. The predictor 272*b* is thus constantly updated with the most recent comparison to accurately predict the next occurring word sample.

The predicted AMPS component is also routed to the interpolate-by-4 circuit 272*e*. The interpolate-by-4 circuit 272*e* linearly interpolates the AMPS component to a reconstructed version of the AMPS interferer component having the original 4 samples per period. The linearly interpolated original length AMPS interferer is negated and added to a delayed version of the AMPS+CDMA word using an adder 272*f*, resulting the difference between the two words. A signal delay 272*g* is used to delay the AMPS+CDMA word L sample periods which allows the predictor 272*b* to accurately predict and construct the AMPS interferer component. The adder 272*f* outputs only the CDMA component of the CDMA+AMPS word to the receiver output. The process is repeated every 10-bit word in succession until the entire word stream has been processed. This processing is performed in parallel on the I and Q channels, producing AMPS-attenuated I and Q channel data words 270*i* and 270*q*.

Figure 6:
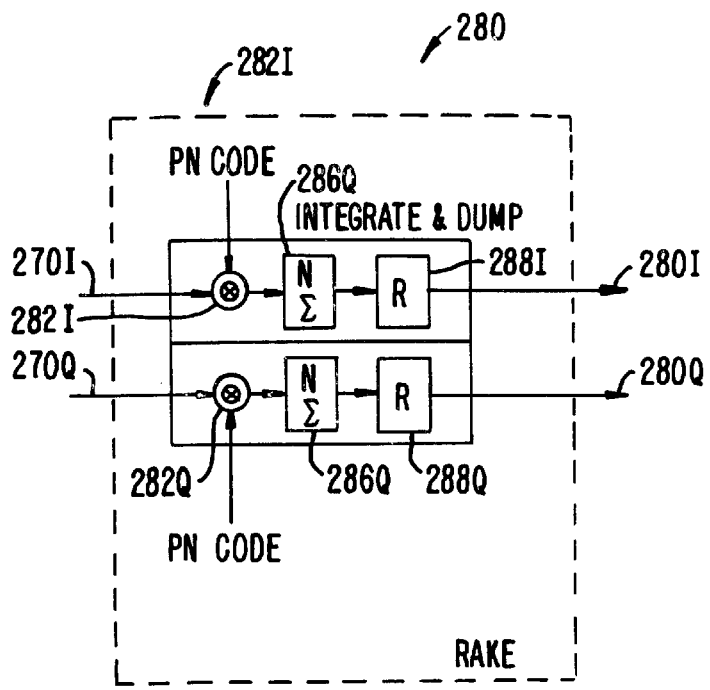
FIG. 6 illustrates an exemplary embodiment of the rake receiver in accordance with the present invention.

The AMPS-reduced I and Q data 270i and 270q is supplied to the rake receiver 280. As explained above, the rake receiver 280 operates with the QDC 240 to remove any DC voltage level which may persist in the magnitude of the data words. FIG. 6 illustrates one embodiment of the rake receiver 280 which includes I and Q channel PN code generators 282i and 282q, correlators 284i and 284q, accumulators 286i and 286q, and registers 288i and 288q.

In operation, the I and Q channel correlators 284i and 284q receive the I and Q channel data 270i and 270q and I and Q channel PN codes from the PN code generators 282i and 282q. Typically, the PN code generators 282i and 282q generate random sequences of 1 and 0 which have a high degree of correlation with I and Q channel data 270i and 270q intended for the receiver. The present invention uses PN codes consisting of sequences of 1 and −1 to determine correlation with the incoming I and Q channel data having positive and negative values.

The resulting I and Q channel correlations are supplied to accumulators 286i and 286q. There, the I and Q correlated values are compared with a predefined threshold value. When the I and Q channel correlations are greater than the threshold value indicating a high degree of correlation, a match is indicated and the I and Q channel data is stored in registers 288i and 288q for further processing. If the I and Q channel correlations are less than the threshold value, a low correlation is indicated. In this case, the I and Q channel data is discarded and the next sequence of data words is processed during the next sampling period to determine if a high correlation exists.

The magnitude and sign of the I and Q channel data words 270i and 270q allow the extraction of a constant DC offset encoded within the data words. As explained above, the AMPS interferer component is effectively reduced or eliminated at this point in the processing, leaving only the superimposed DC voltage as the remaining error. The correlators 284i and 284q process an even number of data words during one sample period. As shown above, the QDC 260 produces data words, one-half of which are negative, and the other half being positive. If the I and Q channel data words 270i and 270q are highly correlated with the local I and Q channel PN codes 282i and 282q, the accumulators 286i and 286q will retain the negative and positive data words. Since an equal number of data words are assigned positive and negative values of equal magnitude (±1), adding the data words removes any commonly occurring offset therebetween. In this manner, any DC offset signal is removed from each of the I and Q channel data 270i and 270q during the accumulation period. The rake receiver 280 outputs the corrected data 280i and 280q for further signal processing as required.

The above described CDMA receiver may be used as a dedicated CDMA receiver, for instance, in PCS-band systems where AMPS signals appear only as interference, or as a dual mode CDMA/AMPS receiver in which the receiver is capable of processing both AMPS and CDMA signals in addition to removing the AMPS interferer when receiving CDMA data. In the later case, the CDMA receiver will include correlation circuitry (not shown) coupled to the output of the digital filters 262 and 264 which controllably bypasses the noise cancellation circuitry 272 and 274 when AMPS signal processing is desired. The correlation circuitry may include, for instance, a carrier lock loop and/or a delay lock loop, the preferred embodiments of which are described in the co-pending provisional application No. 60/092,374 "A VARIABLE CLOCK RATE CORRELATION CIRCUIT FOR A CDMA RECEIVER AND METHOD OF OPERATION," herein incorporated by reference. Of course, those skilled in the art will appreciate that other AMPS receiver circuitry may be coupled at various locations to the CDMA receiver shown in FIG. 2 to detect and process AMPS signals.

While the above is a complete description of the preferred embodiments of the invention, various alternatives modifications and equivalence may be used. It should be evident that the present invention is equally applicable by making appropriate modifications to the embodiments described above. Therefore, the above description should not be taken as limiting the scope of the invention which is defined by the metes and bounds of the appended claims.

What is claimed is:

1. A CDMA receiver, comprising:

an analog to digital converter having an ADC input coupled to receive an incoming analog signal and an ADC output;

a digital baseband conversion circuit having an input coupled to said ADC output, and a digital baseband output;

digital filter circuitry having an input coupled to said digital baseband output and a digital filter output;

a rake receiver circuit having an input coupled to said digital filter output and a data output;

an automatic gain control amplifier having a signal input coupled to receive said incoming signal, an output coupled to said analog to digital converter, and an AGC control input; and a gain control circuit having an input coupled to said ADC output and an output coupled to said AGC control input, wherein said analog to digital converter includes an input saturation level and said control signal indicates the margin between the output power of said automatic gain control amplifier and said input saturation level of said analog to digital converter.

2. The CDMA receiver of claim 1, further comprising digital noise cancellation circuitry for rejecting highly correlated signals, said digital noise cancellation circuitry having an input coupled to said digital filter output and a noise cancellation output coupled to said rake receiver input.

3. The CDMA receiver of claim 2, wherein said output power of said automatic gain control amplifier comprises at least a portion of said highly correlated signal.

4. The CDMA receiver of claim 1, further comprising correlation circuitry coupled to said digital filter circuitry for processing a highly correlated signal.

5. The CDMA receiver of claim 3, wherein said digital baseband output comprises an I channel data stream and a Q channel data stream;

wherein said digital filter circuit comprises an I channel digital filter for filtering said I channel data stream and a Q channel digital filter for filtering said Q channel data stream;

wherein said noise cancellation circuitry comprises an I channel noise circuit and a Q channel noise circuit; and wherein said rake receiver produces a processed I channel data stream and a processed Q channel data stream.

6. A CDMA receiver for receiving CDMA signals and for rejecting highly correlated signals, comprising:

an analog to digital converter having an input and an output, said analog to digital converter receiving a CDMA signal and a highly correlated signal and producing in response digital data containing a CDMA signal component and a highly correlated signal component, said analog to digital converter having an optimum input amplitude range which includes the presence of said highly correlated signal;

digital noise cancellation circuitry having an input coupled to said analog to digital converter output and an output, said digital noise cancellation receiving said digital data, sampling a previously occurring highly correlated signal component occurring therein, and based thereon, generating a predicted highly correlated signal component, said digital noise cancellation circuitry subtracting said predicted highly correlated signal component from said digital data and outputting said CDMA signal component only;

digital baseband conversion circuitry having an input coupled to said analog to digital converter and an output coupled to said digital noise cancellation circuitry, said digital baseband conversion circuitry outputting alternatively negated data, wherein said each of said alternatively negated data includes a DC offset voltage component; and a rake receiver having an input coupled to said digital baseband conversion circuitry and an output, said rake receiver receiving and adding at least one pair of said alternatively negated data, said addition operating to arithmetically cancel the DC offset voltage component included within each of said at least one pair of alternatively negated data.

7. The CDMA receiver of claim 6, further comprising digital filter circuitry having an input coupled to said baseband conversion circuitry and an output coupled to said digital noise cancellation circuitry, said digital filter circuitry attenuating an adjacent out-of-band signal received into said CDMA receiver.

8. The CDMA receiver of claim 7, wherein said analog to digital converter further comprises a control signal output for generating an ADC control signal indicative of the input amplitude of said received CDMA and highly correlated signals, said CDMA receiver further comprising:

an automatic gain control circuit having a signal input for receiving said CDMA and highly correlated signals, a control input for receiving an AGC control signal, and a signal output coupled to said analog to digital converter input for providing an AGC output signal, said automatic gain control circuit varying the gain/attenuation applied to said CDMA and highly correlated signals, wherein said level of said gain/attenuation is determined by said gain control signal; and a gain control circuit coupled to said analog to digital converter for receiving said ADC control signal and for producing said AGC control signal, said gain control circuit producing said AGC control signal in response to said received ADC control signal so that the amplitude of said AGC output signal, including said highly correlated signal, is within said optimum input power range of said analog to digital converter.

9. The receiver of claim 8, wherein said digital noise cancellation circuitry comprise:

a linear adaptive predictor having an input and an output, said linear adaptive predictor receiving said digital data comprising said CDMA component and said highly correlated signal component, and based thereon, generating a predicted highly correlated signal component, said predicted highly correlated signal component being substantially equivalent to the highly correlated signal component of subsequent digital data;

a first adder having a first input for receiving a negated version of said predicted highly correlated signal component, a second input for receiving an actual version of the next occurring digital data word comprising a highly correlated signal component, and an output, said first adder producing a difference signal comprising substantially the difference between the value of said actual, next occurring, highly correlated signal component and the value of said predicted highly correlated signal component;

a weight update circuit having an input coupled to said first adder and an output coupled to said linear adaptive predictor, said weight update circuit receiving said difference signal and transmitting a tuning signal to said adaptive linear predictor to improve a subsequent prediction based upon said difference signal;

a signal delay having an input for receiving digital data and an output for outputting said digital data delayed by L sample periods, wherein said L sample periods is sufficient to allow the value of said predicted highly correlated signal component to approach the value of said actual, next occurring, highly correlated signal component;

a second adder having a first input coupled to said L-unit signal delay for receiving said L-period delayed version of said digital data, a second input coupled to said output of said adaptive linear predictor for receiving said predicted highly correlated signal component, and an output, said second adder producing substantially said CDMA signal component only.

10. The CDMA receiver of claim 9, wherein said noise cancellation circuitry further comprises a decimate-by-N circuit having an input for receiving at least one of said data words, each comprising said CDMA and AMPS interferer components, and an output coupled to said linear adaptive predictor input and to said second input of said first adder, said decimate-by-N circuit removing N samples of said data words every sample period to render further unpredictable said CDMA component of said at least one data word, and wherein said decimation does not render said AMPS interferer component unpredictable;

an interpolate-by-N circuit having an input coupled to said predictor output and an output coupled to said second input of said second adder; said interpolate-by-N circuit linearly reconstructing said decimated data word by linearly interpolating and replacing said N decimated words.

11. A CDMA receiver for processing CDMA signals and for removing a DC voltage superimposed onto digital data corresponding to the CDMA signals, the CDMA receiver comprising:

a downconverter having an input for receiving said CDMA signals and an output for producing IF signals corresponding thereto;

an analog to digital converter coupled to said downconverter for converting said IF signals to data words corresponding thereto;

a digital baseband conversion circuit coupled to said analog to digital converter for alternatively assigning positive and negative signs to said data words; and a rake circuit coupled to said digital baseband conversion circuit that removes said superimposed DC voltage.

12. A method for processing CDMA signals, comprising the steps of:

receiving a signal having a CDMA signal component and a highly correlated signal component, said signal including a DC offset;

digitizing said received signal to produce signal data having a CDMA signal component and a highly correlated signal component;

digitally frequency converting said signal data to produce baseband data having a CDMA signal component and a highly correlated signal component;

decimating said baseband data;

alternately negating said baseband data;

predicting said decimated baseband data to produce a predicted highly correlated baseband data;

subtracting said predicted highly correlated baseband data from said baseband data to produce CDMA baseband data; and removing said DC offset from said CDMA baseband data with a rake receiver.

13. The method of claim 12, further comprising the step of digitally filtering said baseband data.

* * * * *